(12) United States Patent
Seller

(10) Patent No.: US 8,249,190 B2
(45) Date of Patent: Aug. 21, 2012

(54) DUAL CARRIER MODULATION

(75) Inventor: Olivier Bernard Andre Seller, Auribeau-sur-Siagne (FR)

(73) Assignee: Cambridge Silicon Radio Limited, Cambridge (GB)

( * ) Notice: Subject to any disclaimer, the term of this patent is extended or adjusted under 35 U.S.C. 154(b) by 738 days.

(21) Appl. No.: 12/397,483

(22) Filed: Mar. 4, 2009

(65) Prior Publication Data

US 2009/0323858 A1   Dec. 31, 2009

(30) Foreign Application Priority Data

Mar. 20, 2008  (GB) ................................. 0805302.7

(51) Int. Cl.
*H04L 27/36* (2006.01)
(52) U.S. Cl. ........ 375/298; 375/299; 375/300; 375/308; 375/260; 375/261; 375/267; 375/268; 375/279; 375/329; 375/322; 375/347; 375/349
(58) Field of Classification Search .................. 375/298, 375/299, 300, 308, 260, 261, 267, 268, 279, 375/329, 322, 347, 349
See application file for complete search history.

(56) References Cited

U.S. PATENT DOCUMENTS

2008/0212694 A1 * 9/2008 Leach et al. .................. 375/260

* cited by examiner

*Primary Examiner* — Kabir A Timory
(74) *Attorney, Agent, or Firm* — Novak Druce DeLuca + Quigg LLP

(57) ABSTRACT

A coding unit for determining two different types of modulation to be applied to two carrier signals such that each modulated carrier signal represents a data symbol in accordance with a group of modulation points, each modulation point representing a modulation of the first type and a modulation of the second type that can be applied to one of the carrier signals, the coding unit being arranged to associate the data symbol with a first one of the modulation points by applying a first mapping function to that data symbol and associate the data symbol with a second one of the modulation points by applying a second mapping function to that data symbol, the first and second mapping functions being such that they each map two different data symbols to a respective common modulation point; and determine the modulation of the first and second types to be applied to the first carrier signal to be the modulation of the first and second types represented by the first modulation point and the modulation of the first and second types to be applied to the second carrier signal to be the modulation of the first and second types represented by the second modulation point.

40 Claims, 12 Drawing Sheets

DUAL CARRIER MODULATION

BACKGROUND OF THE INVENTION

The invention relates to a coding unit for determining how the amplitude and phase of two carrier signals should be modulated so as to transmit a data symbol by means of those carrier signals.

FIG. 1 illustrates schematically the channel encoding system in one example of a dual carrier modulation (DCM) transmitter. A bit stream 1 for transmission is passed to an encoding unit 2 which generates two streams 3, 4 of QPSK (quaternary phase shift keyed) data. Those streams pass to a decision matrix 5 which generates two streams 6, 7 of 16QAM (16 state quadrature amplitude modulation) data. The matrix 5 operates in such a way that both QAM streams are dependent on both QPSK streams, with the result that if either one of the QAM streams is received perfectly then a receiver can recover both QPSK streams from it. Each QAM stream is used to modulate a respective tone 8, 9 and the resulting signals are combined and transmitted from an antenna 10.

This scheme is used in the modern UWB (ultra-wideband) protocol. FIG. 2 illustrates a channel of that system. The channels are 528 Mhz wide. When a particular channel (e.g. channel 20) is being used the tones 21, 22 are spaced 210 MHz apart from each other.

One reason for transforming the QPSK data streams to QAM data streams in this way is to introduce additional diversity into the system. It would be possible to modulate two carriers directly with respective ones of the QPSK data streams. However, that would require the receiver to receive successfully at both carrier frequencies in order to fully recover the original data. In practice (as illustrated by noise level 23 in FIG. 2) it is less likely that there will be poor propagation conditions at both of the carrier frequencies than at one. The scheme described above has the advantage that it allows the original data to be recovered even if only one carrier is received.

FIG. 3 shows the improvement in bit error rate (BER) and packet error rate (PER) that may be achieved by using dual carrier modulation. The improvement seen using dual carrier modulation is due to increased diversity, which leads to a faster improvement in performance as the signal-to-noise ratio (SNR) increases.

DCM using QPSK data can be considered as a unitary transform of the original data into a four dimensional space. An example of this process is illustrated in FIG. 4. Each of the QPSK constellations is rotated by atan(½) (approximately 27 degrees). One constellation is rotated to the right and the other is rotated to the left. A constellation representing the amplitude and phase modulations corresponding to each four-bit symbol for each of the two carrier signals is then generating by taking the real part of the first QPSK constellation and the imaginary part of the second QPSK constellation for the first carrier signal and the real part of the second constellation with the imaginary part of the second constellation for the second carrier signal. This gives a 16 QAM constellation for each carrier that maps every four-bit data symbol onto an amplitude and phase modulation for transmitting that data symbol.

A carrier signal modulated according to the constellations shown in FIG. 4 thus carries all of the information needed to recover the two original QPSK data streams. In addition, the separation between constellation points in the two 16 QAM constellations is maximised, which increases the likelihood of a modulated carrier signal being correctly decoded. Finally, since the transform applied to the QPSK constellations is a unitary transform, the same power is transmitted and the Euclidean distances between transmitted words remain unchanged, so that the performance achieved by both carriers over an additive white Gaussian noise channel (AWGN) is the same.

To increase the data rate further higher order constellations than a QPSK constellation are required as inputs into a dual carrier modulation scheme. One option is to use a 16 QAM constellation as an input for the dual carrier modulation scheme. This scheme follows a similar pattern to that described above and illustrated in FIG. 4, except that it uses two rotated 16 QAM constellations as inputs. The resulting constellations that define the mapping of every eight-bit data symbol onto a signal carrier and contain 256 points. However, a constellation of 256 points has a very high dynamic, so that more bits are needed for the analogue-to-digital converter, and it is complex to decode the modulated signal because it is necessary to distinguish between the 256 points in the constellation.

Therefore, there is a need for a coding unit capable of implementing an improved modulation scheme that still offers a high data rate and the advantages of diversity but does not involve the complexity of existing schemes.

SUMMARY OF THE INVENTION

According to a first embodiment of the invention, there is provided a coding unit for determining two different types of modulation to be applied to two carrier signals such that each modulated carrier signal represents a data symbol in accordance with a group of modulation points, each modulation point representing a modulation of the first type and a modulation of the second type that can be applied to one of the carrier signals, the coding unit being arranged to associate the data symbol with a first one of the modulation points by applying a first mapping function to that data symbol and associate the data symbol with a second one of the modulation points by applying a second mapping function to that data symbol, the first and second mapping functions being such that they each map two different data symbols to a respective common modulation point and determine the modulations of the first and second types to be applied to the first carrier signal to be the modulations of the first and second types represented by the first modulation point and the modulations of the first and second types to be applied to the second carrier signal to be the modulations of the first and second types represented by the second modulation point.

Each data symbol may be capable of representing one of a predetermined number of values and the coding unit may be arranged to determine the group of modulation points such that the number of modulation points is less than that number of predetermined values.

The coding unit may be arranged to associate a data symbol with first and second modulation points such that a first data symbol that is associated with a first modulation point that is the same as a first modulation point of another data symbol is associated with a second modulation point that is different from the second modulation point of that other data symbol. The coding unit may be arranged to form an array of modulation points in which the modulation points are arranged in rows and columns in the in-phase and quadrature space. The coding unit may be arranged to associate the first data symbol with a second modulation point that is distant in the array from the second modulation point of the other data symbol.

Each data symbol comprises a predetermined number of bits that can each take one of a predetermined set of bit values, the coding unit being arranged to form a data set that contains every combination of the bit values that can be represented by half of that predetermined number of bits.

The coding unit may be arranged to form the data set into an array of bit value combinations in which the bit value combinations are arranged in rows and columns in the in-phase and quadrature space. The coding unit may be arranged to form the array of bit value combinations into a 16 QAM constellation or an 8 QAM constellation.

The coding unit may be arranged to apply a function to the array of bit value combinations to form a transformed array in which the bit value combinations are arranged in more rows and/or columns than in the array of bit value combinations. At least one of the rows and/or columns of the transformed array may contain more than one bit value combination.

The coding unit may be arranged to apply a translation function and/or a rotation function to the array of bit value combinations to form the transformed array.

The coding unit may be arranged to form the array of bit value combinations to contain a plurality of subsets of bit value combinations, the coding unit being arranged to apply a function to each of those subsets individually to form the transformed array.

The coding unit may be arranged to form the array of bit value combinations such that the bit value combinations are arranged into four quadrants, the coding unit being arranged to apply a function to each of those quadrants individually.

The coding unit may be arranged to apply a second function to the transformed array to form a contracted array in which each row and/or column is located closer to its neighbouring row and/or column than in the transformed array.

The coding unit may be arranged to form the array of modulation points to have the same number of rows and columns as the transformed array such that each row of the transformed array is associated with an equivalent row in the array of modulation points and each column of the transformed array is associated with an equivalent row in the array of modulation points.

The coding unit may be arranged to form the array of modulation points such that the spacing between neighbouring rows and columns in the array of modulation points is equal to the spacing between neighbouring rows and columns in the contracted array.

The coding unit may be arranged to form the array of modulation points into a 64 QAM constellation or a 16 QAM constellation.

The coding unit may be arranged to form two data sets, each containing every combination of the predetermined set of bit values that can be represented by half of the predetermined number of bits, form each data set into an array containing those bit value combinations arranged in rows and columns in the in-phase and quadrature space, and apply a function to each of those arrays of bit value combinations to form first and second transformed arrays.

The coding unit may be arranged to associate the data symbol with a first modulation point by determining the bit value combination comprised in the first half of the plurality of bits of the symbol and identifying a column in the first transformed array in which that bit value combination is located, determining the bit value combination comprised in the second half of the plurality of bits of the symbol and identifying a row in the second transformed array in which that bit value combination is located and associating the data symbol with the modulation point located in the equivalent row in the array of modulation points to the identified row and the equivalent column in the array of modulation points to the identified column.

The coding unit may be arranged to associate the data symbol with a second modulation point by determining the bit value combination comprised in the second half of the plurality of bits of the symbol and identifying a column in the second transformed array in which that bit value combination is located, determining the bit value combination comprised in the first half of the plurality of bits of the symbol and identifying a row in the first transformed array in which that bit value combination is located and associating the data symbol with the modulation point located in the equivalent row in the array of modulation points to the identified row and the equivalent column in the array of modulation points to the identified column.

The coding unit may be arranged to associate the data symbol with the first modulation point and the second modulation point such that each of those modulation points represents a different combination of a modulation of the first type and a modulation of the second type.

The coding unit is arranged to determine the first type of modulation to be an amplitude modulation and the second type of modulation to be a phase modulation.

The coding unit may be arranged to directly map the data symbol to the first and second modulation points.

The coding unit may be arranged to map the data symbol exclusively to a modulation point contained in the group of modulation points.

The coding unit may be arranged to associate the data symbol with the first modulation point and the second modulation point in accordance with a way of mapping a data symbol onto a modulation point by means of forming a series matrices as claimed in claims 4 to 23.

The coding unit may be arranged to treat the data symbol as comprising two data words, each data word comprising half of the number of bits comprised in the data symbol.

The coding unit may be arranged to treat the two data words as if they were each contained in a respective constellation of data words arranged in rows and columns in the in-phase and quadrature space.

The coding unit may be arranged to treat the group of modulation points as if they were arranged in a constellation of modulation points arranged in rows and columns in the in-phase and quadrature space such that each of said rows corresponds to an equivalent row in each of the constellations of data words and each of said columns corresponds to an equivalent column in each of the constellations of data words.

The coding unit may be arranged to associate the data symbol with a first modulation point such that the first modulation point would be located in the constellation of modulation points in the equivalent column to the column in which the first one of the data words comprised in the data symbol would be located in its respective constellation of data words and in the equivalent row to the row in which the second one of the data words comprised in the data symbol would be located in its respective constellation of data words.

The coding unit may be arranged to associate the data symbol with a second modulation point such that the second modulation point would be located in the constellation of modulation points in the equivalent row to the row in which the first one of the data words comprised in the data symbol would be located in its respective constellation of data words and in the equivalent column to the column in which the second one of the data words comprised in the data symbol would be located in its respective constellation of data words.

According to a second embodiment of the invention, there is provided a decoding unit for determining a transmitted data symbol in dependence on a first type of modulation and a second type of modulation applied to two carrier signals, the decoding unit being arranged to determine a modulation of the first type and a modulation of the second type applied to the first carrier signal and associate this with one or more data symbols, and, if the modulations of the first and second type applied to the first carrier signal are associated with more than one data symbol, determine a modulation of the first type and a modulation of the second type applied to the second carrier signal and determine the transmitted data symbol to be the data symbol of the more than one data symbols associated with the modulations of the first and second type applied to the first carrier signal that is most closely associated with the modulations of the first and second type applied to the second carrier signal.

The decoding unit may be arranged to determine a group of modulation points, each modulation point representing a modulation of the first type and a modulation of the second type that can be applied to one of the carrier signals.

The decoding unit may be arranged to map one or more data symbols onto each modulation point.

The decoding unit may be arranged to associate modulations of the first and second type applied to one of the carrier signals with the one or more data symbols mapped onto the modulation point with which those modulations of the first and second type are most closely associated.

The decoding unit may be arranged to determine that the modulation point with which modulations of the first and second type are most closely associated is the modulation point from which that combination of modulations of the first and second type has the lowest interpoint spacing in the in-phase and quadrature space.

The decoding unit may be arranged to map a different one or more data symbols onto each modulation point for the first carrier signal than for the second carrier signal.

The decoding unit may be arranged to associate the modulations of the first and second type applied to the first carrier signal with the one or more data symbols mapped for the first carrier signal onto the modulation point from which that combination of modulations of the first and second type has the lowest interpoint spacing in the in-phase and quadrature space.

The decoding unit may be arranged to determine that the transmitted data symbol is the data symbol of the more than one data symbols that is mapped for the second carrier signal onto the modulation point from which the combination of the modulations of the first and second type applied to the second carrier signal has the lowest interpoint spacing in the in-phase and quadrature space.

The decoding unit may be arranged to determine a transmitted symbol in dependence on a first type of modulation that is an amplitude modulation.

The decoding unit may be arranged to determine a transmitted symbol in dependence on a second type of modulation that is a phase modulation.

According to a third embodiment of the invention, there is provided an encoder arranged to encode a data symbol for transmission by means of two carrier signals in accordance with an encoding scheme having the properties that, for a first carrier signal, a plurality of data symbols are mapped to a single modulation point in a constellation of modulation points and, for a second carrier signal, that plurality of symbols are mapped to different modulation points in the constellation of modulation points.

The encoder may be arranged to encode a signal for transmission in accordance with an encoding scheme in which data symbols are mapped to a modulation point in the constellation of modulation points by means of the constellations shown in any of FIGS. 7 to 11.

The encoder may be arranged to encode a signal for transmission in accordance with an encoding scheme in which data symbols are mapped to a modulation point in the constellation of modulation points by means of constellations that are unitary transforms of the constellations shown in any of FIGS. 7 to 11.

The encoder may be arranged to encode a signal for transmission in accordance with an encoding scheme in which data symbols are mapped to a modulation point in the constellation of modulation points by means of constellations that are a rotation through a multiple of 90 degrees of the constellations shown in FIGS. 7 to 11.

The encoder may be arranged to encode a signal for transmission in accordance with an encoding scheme in which data symbols are mapped to a modulation point in the constellation of modulation points by means of constellations that are a reflection in either the in-phase or quadrature axis of the constellations shown in FIGS. 7 to 11.

The encoder may be arranged to encode a signal for transmission in accordance with an encoding scheme in which data symbols are mapped to a modulation point in the constellation of modulation points by means of constellations arranged as shown in FIGS. 7 to 11 but with the real part of each C1 data word exchanged with the imaginary part of the corresponding C2 data word.

The encoder may be arranged to encode a signal for transmission in accordance with an encoding scheme in which data symbols are mapped to a modulation point in the constellation of modulation points by means of constellations arranged as shown in FIGS. 7 to 11 but with the real part of each C2 data word exchanged with the imaginary part of the corresponding C1 data word.

The encoder may be arranged to encode a signal for transmission in accordance with an encoding scheme in which data symbols are mapped to a modulation point in the constellation of modulation points by means of constellations arranged as shown in FIGS. 7 to 11 but with each C1 data word exchanged with the corresponding C2 data word.

The encoder may be arranged to encode a signal for transmission in accordance with an encoding scheme in which data symbols are mapped to a modulation point in the constellation of modulation points by means of constellations arranged as shown in FIGS. 7 to 11 but with each C1 data word exchanged with the corresponding C2 data word.

The encoder may be arranged to encode a signal for transmission in accordance with an encoding scheme in which data symbols are mapped to a modulation point in the constellation of modulation points by means of constellations that are arranged as shown in FIGS. 7 to 11 but with different bit combinations contained in one more of a C1 data word and/or a C2 data word.

BRIEF DESCRIPTION OF THE DRAWINGS

The present invention will now be described by way of example only, with reference to the accompanying drawings. In the drawings.

DETAILED DESCRIPTION OF THE INVENTION

A coding unit may be arranged to determine the amplitude and phase modulations that should be applied to the two carrier signals of a DCM scheme. The coding unit may be arranged to first determine a group of modulation points that represent the different amplitude/phase modulation combinations that may be applied to the carrier signals. The coding unit may then be arranged to associate a data symbol to be transmitted by the carrier signals with two of the modulation points. This may be achieved by using a first mapping function to map the data symbol onto a first modulation point and a second mapping function to map the data symbol onto a second modulation point. The first and second modulation points each carry all of the information associated with one data symbol, together with some or all of the information associated with another data symbol. The coding unit may then be arranged to determine that the amplitude and phase modulation associated with the first modulation point is to be applied to the first carrier signal and that the amplitude and phase modulation associated with the second modulation point is to be applied to the second carrier signal.

The first and second modulation point may be different, so that each represents a different combination of amplitude and phase modulation.

The first and second mapping functions that are used by the coding unit may each map two different data symbols onto a respective common modulation point, as will be described in more detail below.

Figure 1:
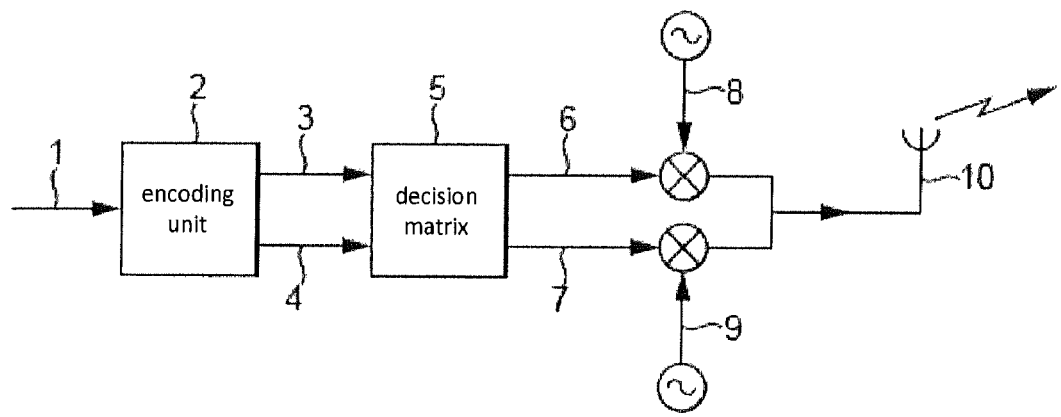
FIG. 1 illustrates a transmitter.
Figure 2:
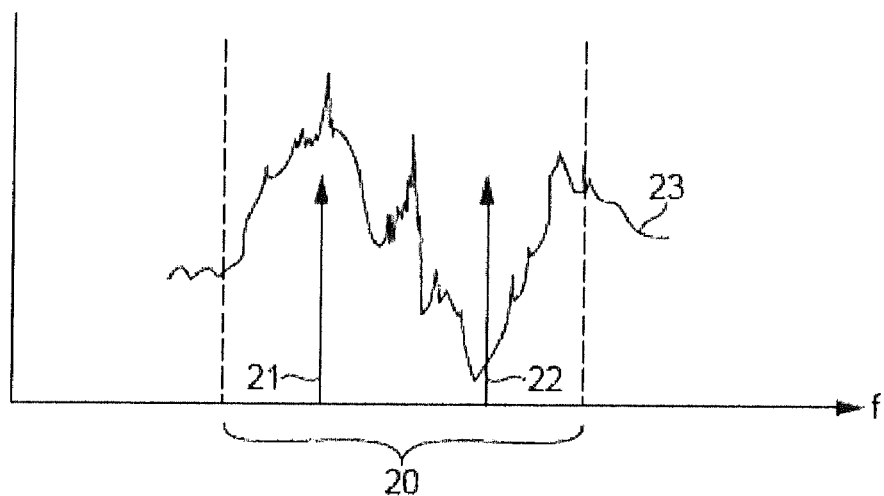
FIG. 2 illustrates a UWB channel.
Figure 3:
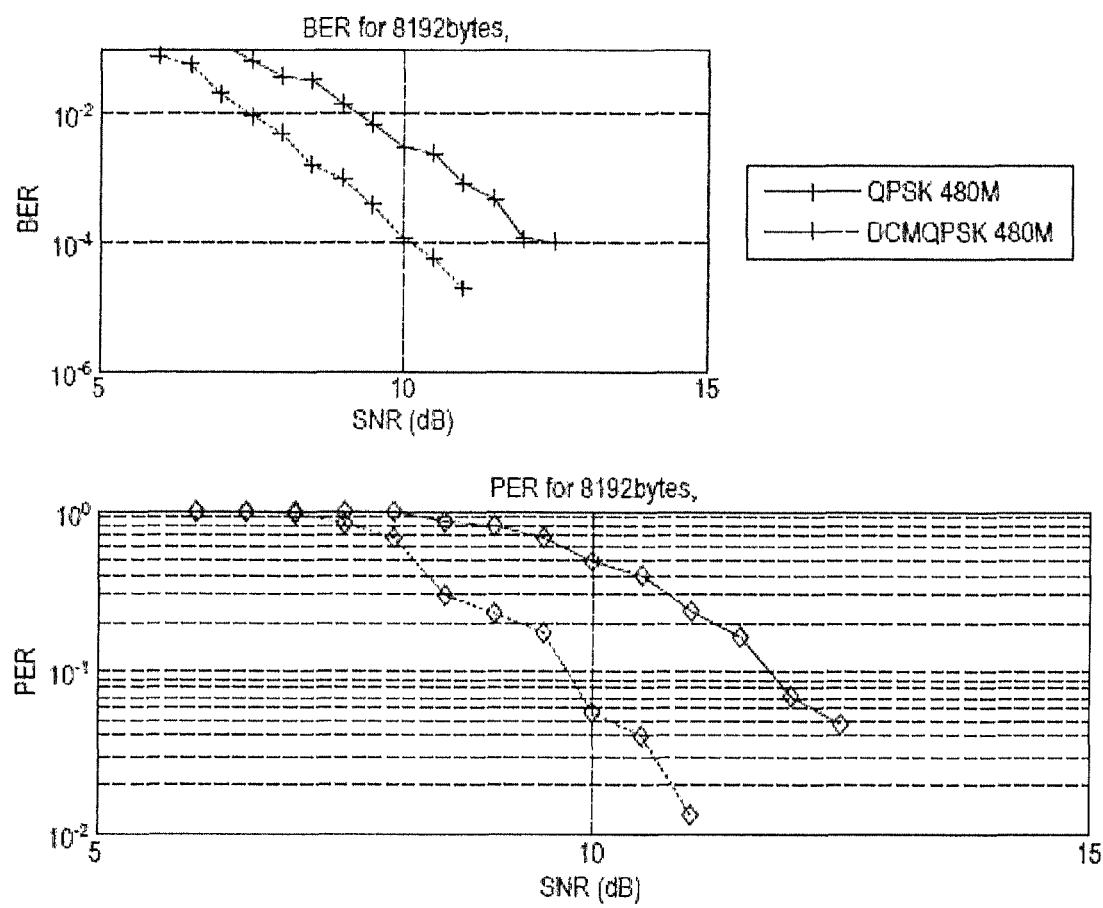
FIG. 3 illustrates the improvement in bit error rate and packet error rate that can be achieved using dual carrier modulation.
Figure 4:
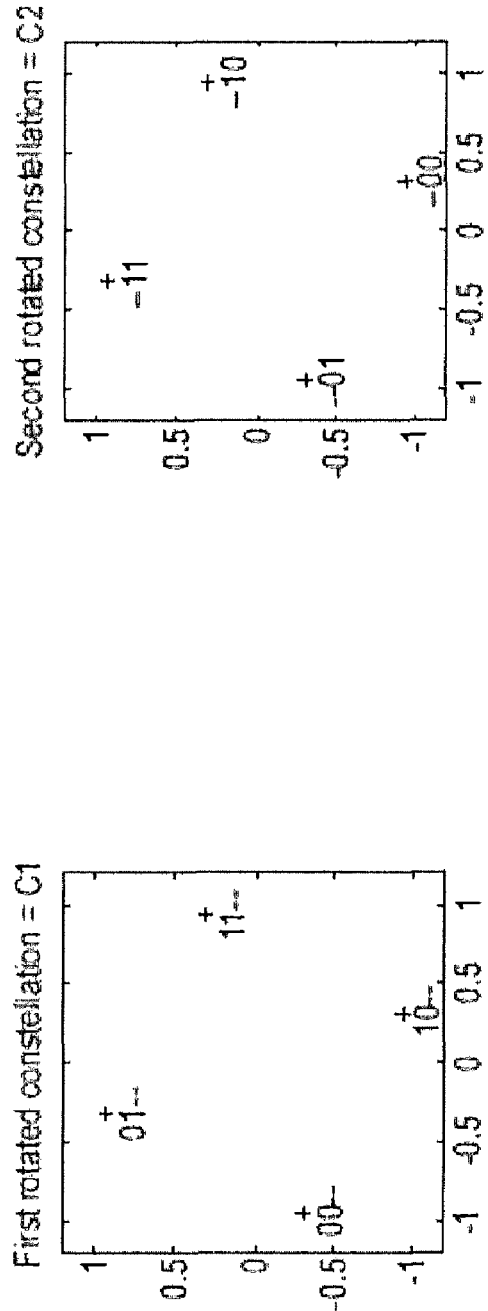
FIG. 4 illustrates the creation of two 16 QAM dual carrier constellations from a QPSK input.
Figure 4:
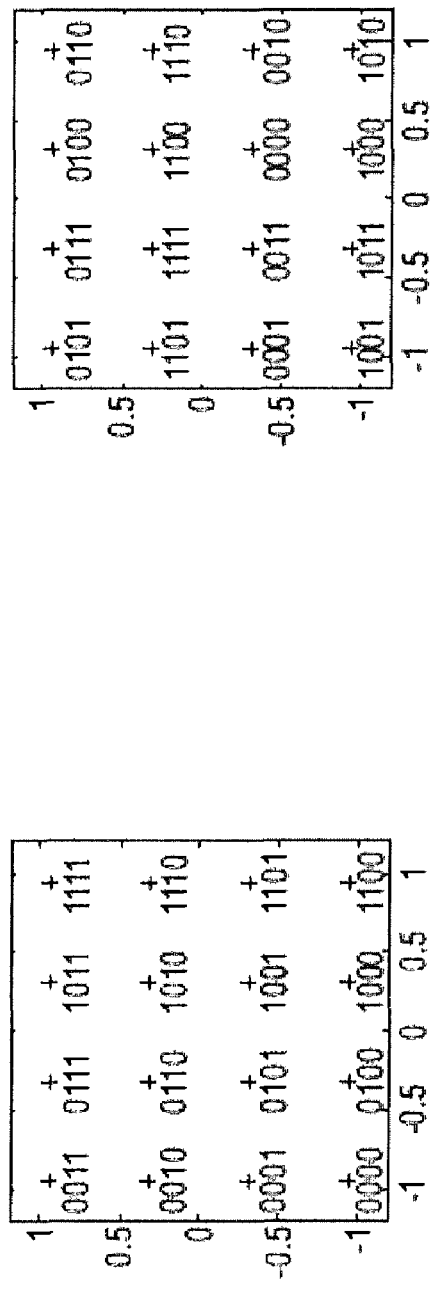
Figure 5:
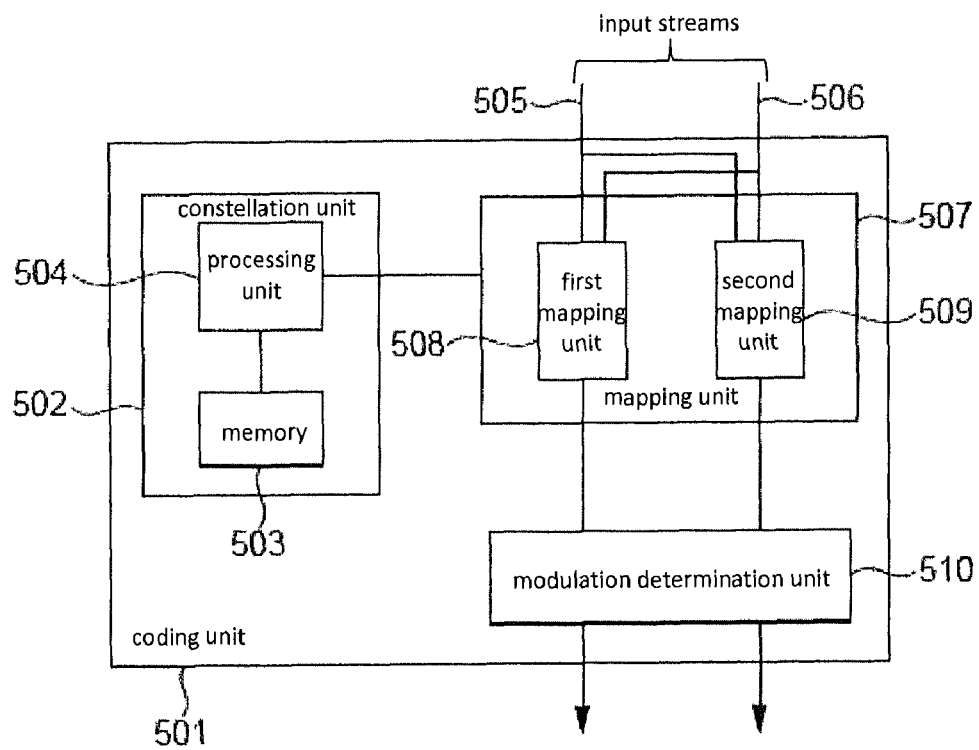
FIG. 5 illustrates a coding unit.

An example of a coding unit is shown in FIG. 5. The coding unit is shown generally at 501 and it comprises constellation unit, a mapping unit 507 and a modulation determination unit 510. The constellation unit determines the group of modulation points and it may comprise a processing unit 504 and a memory 503. The processing unit may determine the group of modulation points using QAM or other constellations stored in its memory. The memory may store different starting constellations for forming the modulation constellation with the processing unit selecting the appropriate starting point in dependence on the form of the data being received in input streams 505, 506 by the mapping unit. The processing unit may determine a processing scheme for generating the modulation constellation in dependence on factors such as the required data rate and quality of service, and the capabilities of the receiving device, if known. Alternatively, the memory of the constellation unit may store all of the modulation constellations that may be used so that the pre-formed constellations can be accessed when required.

The constellation unit may be connected to the mapping unit that receives two streams of input data and maps the incoming data symbols to an appropriate combination of amplitude and phase modulation using first and second mapping functions. The two input streams may each contain half of each data symbol. So, for example, if each data symbol contains eight bits, the first data stream may contain bits one to four of each data symbol while the second data stream may contain bits five to eight of each data symbol. Suitably the first mapping unit 508 applies the first mapping function to the incoming data streams and the second mapping unit 509 applies the second mapping function to the incoming data streams. The modulation unit 510 receives the amplitude and phase modulations that have been determined by the mapping unit and outputs two control signals that define how the first and second carrier signals are to be modulated.

The coding unit may suitably be located in a transmitter so that the control signals output by the modulation unit may be output to circuitry in the transmitter that is responsible for modulating the phase and amplitude of the two carrier signals.

The functional units shown in FIG. 5 may be implemented in hardware or software or a combination of both. In one implementation, the coding unit may be implemented by a processor running under software control. The mapping functions may be performed by applying mathematical functions to the input data, by using look-up tables or by any other suitable method.

As mentioned above, each of the first and second mapping functions may associate two or more data symbols with the same modulation point. Therefore, the group of modulation points can contain fewer modulation points than the number of possible symbols, since two or more of those symbols will be mapped to the same modulation point. For these symbols there is no redundancy because both carrier signals need to be received to correctly determine which of the data symbols was transmitted. However, the coding unit is suitably arranged to select the data symbols that suffer from this lack of redundancy to be "strong" data symbols so that the data symbol can be correctly decoded even if the second carrier signal is subjected to poor propagation conditions.

Associating two or more data symbols with the same data point may be advantageous because it results in a modulation constellation that has fewer modulation points than existing modulation constellations for data symbols containing a given number of bits. Therefore, the complexity of decoding signals that have been coded using such a modulation constellation is reduced compared with decoding signals that have been coded using existing modulation constellations.

A decoding unit may be arranged to decode both of the modulated carrier signals in situations where the data symbol that has been coded onto one of the carrier signals is undefined due to the amplitude and phase modulation applied to that signal being associated with more than one data symbol. Therefore, the decoding unit may be arranged to, if it determines that the amplitude and phase modulation applied to the first carrier signal are associated with more than one data symbol, determine an amplitude modulation and a phase modulation applied to the second carrier signal and determine which of the data symbols associated with the amplitude and phase modulation of the first carrier signal is most closely associated with the amplitude and phase modulation applied to the second carrier signal.

Figure 6:
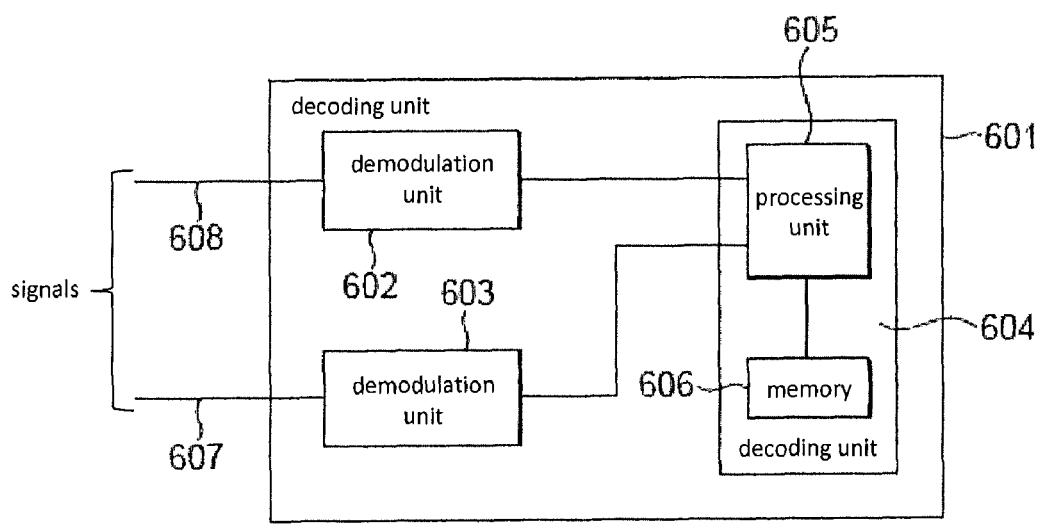
FIG. 6 illustrates a decoding unit.

An example of a decoding unit is shown in FIG. 6. The decoding unit is shown generally at 601 and comprises two demodulation units 602, 603 and a decoding unit 604. Each of the decoding units receives a signal 607, 608 that is indicative of the phase and amplitude modulation applied to the carrier signals. The decoding units may comprise receive circuitry for demodulating the received, modulated carrier signals and thereby determining the phase and amplitude modulation applied to each of the carrier signals or the decoding units may simply be arranged to receive control signals indicative of the phase and amplitude modulation from receive circuitry elsewhere in a receiving device. The decoding unit comprises a processing unit 605 arranged to receive information about the phase and amplitude modulation applied to the first and second carrier signals from the decoding units and a memory 606 for storing the modulation constellations that relate phase and amplitude modulations to data symbols. The memory may store multiple modulation constellations and may determine which of those constellations to use in decoding the received signal in dependence on a modulation scheme that was previously agreed upon between the transmitted and receiver or on information that is contained in the received signals.

The processing unit may use information received from the demodulation unit and information stored in the memory to determine what data symbol has been modulated onto the carrier signals. Because the mapping functions each map more than one symbol onto a particular combination of phase and amplitude modulation, it may be that the processing unit will not be able determine which data symbol has been transmitted from one of the carrier signals alone. For example, the processing unit may determine that the phase and amplitude modulation applied to the first carrier signal could correspond to one of two different data symbols according to the mapping information stored in the memory. The processing unit may therefore look to the second carrier signal to determine which of the two data symbols was transmitted. The first and second mapping functions will typically map the same data symbol onto different combinations of phase and amplitude modulation. Therefore, the processing unit may be able to determine which of the two possible data symbols was actually transmitted by determining which of the two data symbols corresponds to the phase and amplitude modulation seen on the second carrier signal.

The functional units shown in FIG. 6 may be implemented in hardware or software or a combination of both. In one implementation, the decoding unit may be implemented by a processor running under software control. The demapping functions may be performed by applying mathematical functions to the amplitude and phase modulation, by using look-up tables or by any other suitable method.

The coding scheme described above therefore retains some diversity in the system while reducing the number of constellation points between which it is necessary to distinguish. Although some diversity is lost compared with existing schemes in which each data symbol is distinguishable from one carrier signal alone, the complexity of the receive circuitry can be reduced because it does not need to distinguish between so many constellation points. Also, the constellation points can be located further apart than in the existing constellations because there are fewer of them. Therefore, although there is some loss in diversity, the likelihood of symbol errors may be reduced because it is easier to distinguish between neighbouring symbols in the constellation. Also, the transmitter and receiver accuracy requirements are reduced because of the reduced complexity in the coding scheme. For example, fewer bits are required for the ADCs and DACs.

The coding scheme will now be described in more detail with respect to some specific constellations that may be employed. This is for the purposes of example only.

Figure 7:
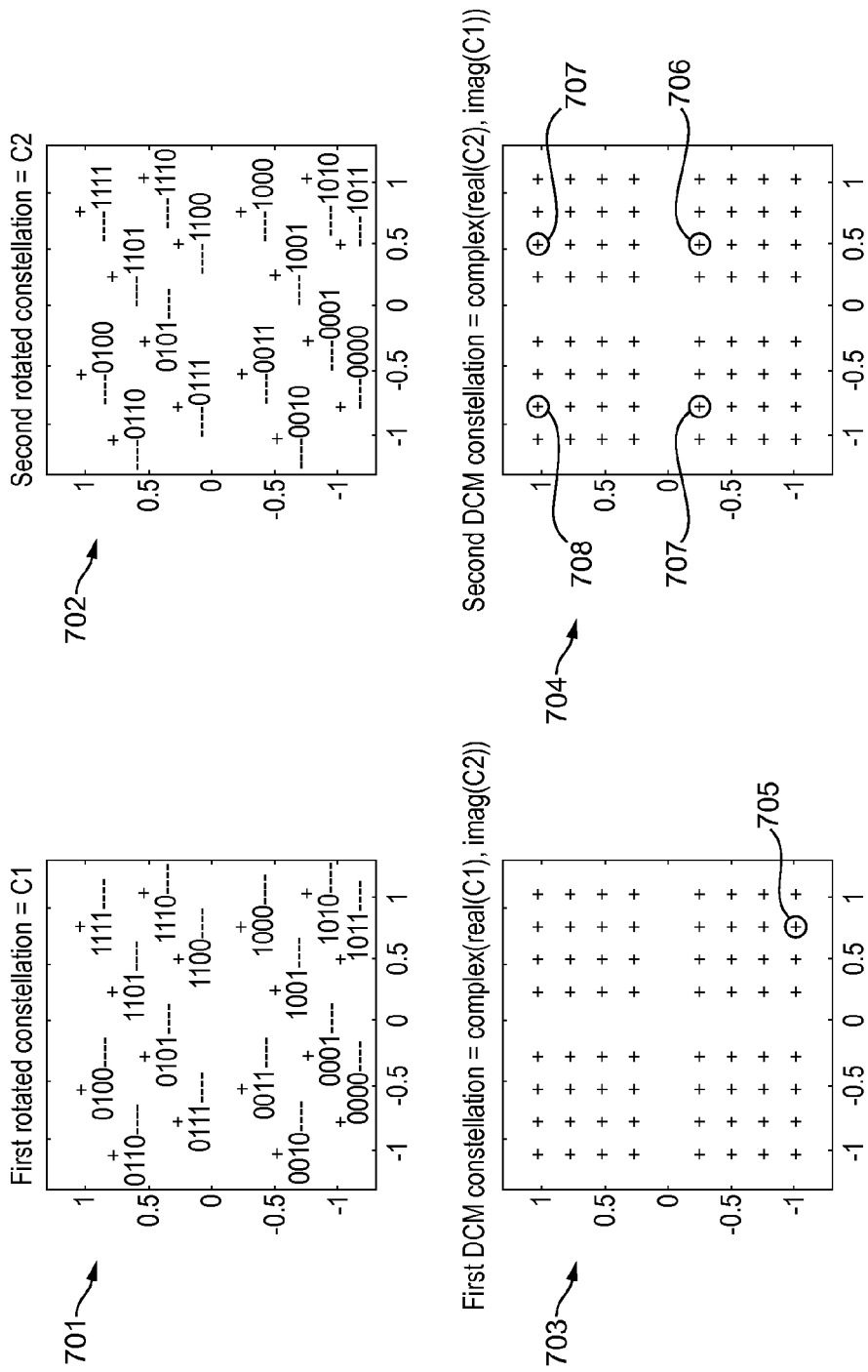
FIG. 7 illustrates a formation of an 81 QAM modulation constellation.

FIG. 7 illustrates two 16 QAM constellations 701, 702 that have each been rotated. These constellations have been formed by rotating each of the four quadrants of the 16 QAM constellations individually. This is different from existing coding schemes in which the constellations are rotated as a whole. Each of the two 16 QAM constellations contains every bit combination for a four-bit symbol in a binary scheme in which each bit may take one of two values. In FIG. 7, the two 16 QAM constellations are identical; however, this need not be the case and the two 16 QAM constellations may contain different arrangements of the possible bit value combinations.

After rotation, some of the points in each quadrant are closer than they were before. However, as the coding is still gray this is not too significant. The resulting modulation constellation contains fewer points than existing constellations for eight-bit symbol DCM and so, with fewer points to distinguish between, error vector magnitude (EVM) constraints are more relaxed.

The modulation constellation is to represent a mapping for eight-bit symbols. The first 16 QAM constellation 701 provides the first four bits for those eight-bit symbols and the second 16 QAM constellation 702 provides the second four bits for those eight-bit symbols. Each of the modulation constellations 703, 704 contains a plurality of points. Each of those points represents a particular combination of phase and amplitude modulation to be applied to a carrier signal. The modulation points are arranged in rows and columns, with the number of rows and columns being the same as the number of rows and columns contained in the rotated 16 QAM constellations.

The first mapping function relates every eight-bit symbol onto a point in the modulation constellation for the first carrier signal 703. An example of how this may be achieved is for the first mapping function to take the real part of the first 16 QAM constellation 701 with the imaginary part of the 16 QAM constellation 702. In effect, this involves mapping every four-bit value from the first constellation 701 onto the corresponding column in the modulation constellation 703 and every four-bit value from the second constellation onto the corresponding row in the modulation constellation 703.

The modulation constellation shown in FIG. 7 is known as an 81-QAM constellation, even though it contains only 64 points. This is because the 64 points are effectively aligned with an 81-point grid. The missing 17 points are those that would be positioned along the zero axes in an 81 QAM constellation.

The second mapping function relates every eight-bit symbol onto a point in the modulation constellation for the second carrier signal 704. An example of how this may be achieved is for the second mapping function to take the imaginary part of the first 16 QAM constellation 701 with the real part of the 16 QAM constellation 702. In effect, this involves mapping every four-bit value from the first constellation 701 onto the corresponding row in the modulation constellation 703 and every four-bit value from the second constellation onto the corresponding column in the modulation constellation 703.

The first and second mapping functions can also be described by considering the coordinates of the symbols on the grid. If the first four bits of the eight-bit symbol are XXXX located at (A, B) in the first grid and the second four bits of the eight-bit symbol are YYYY located at (C, D) in the second grid, then the eight-bit symbol may be located at (A, D) in the constellation for the first carrier signal and at (C, B) in the constellation for the second carrier signal.

As an example, the eight-bit symbol 1000 1011 will be mapped onto constellation point 705 by the first mapping function. However, the eight-bit symbols 1000 0000, 1111 1011 and 1111 0000 will also be mapped onto the same constellation point. Therefore, it would not be possible for the decoder to determine from the first carrier signal alone which of the four possible data symbols has been transmitted. Some redundancy has therefore been lost compared with existing schemes. However, the four data symbols are mapped onto different modulation points on the second carrier signal by the second mapping function. As shown in FIG. 7, data symbol 1000 1011 will map onto point 706, data symbol 1000 0000 will map onto point 707, data symbol 1111 1011 will map onto point 707 and data symbol 1111 0000 will map onto point 708. As shown in FIG. 7, these points are located in different quadrants of the constellation for the second carrier signal. So, although these symbols suffer from a lack of redundancy, they are strong on the second carrier. Therefore, even if the second carrier signal is subject to poor propagation conditions, the decoding unit should still be able to correctly determine which of the four symbols was transmitted because of the relatively large Euclidean distance between the modulation points with which those symbols are associated by the second mapping function.

Figure 8:
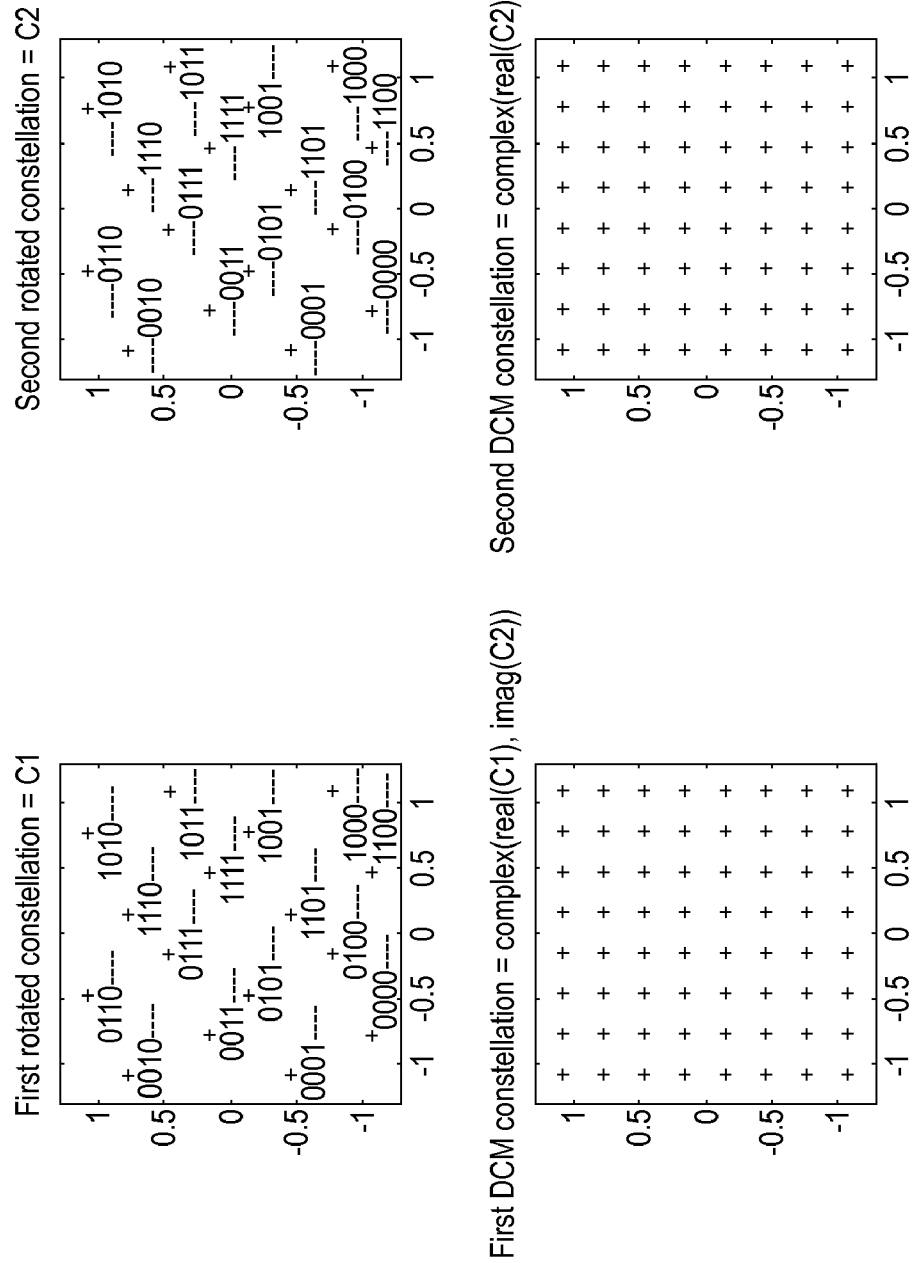
FIG. 8 illustrates a formation of a "shrunk" 81 QAM modulation constellation.

The 81 QAM constellation shown in FIG. 7 can be "shrunk" so that it contains the same number of constellation points but arranged over a 64 QAM grid rather than an 81 QAM grid. This is shown in FIG. 8, in which each quadrant of the transformed data sets is first rotated and then translated. The two left-hand quadrants are shifted to the left and the two right-hand quadrants are shifted to the right. This has the effect of "shrinking" the modulation constellation. As an example, if an 81 QAM grid contains rows and columns located at −8, −6, −4, −2, 0, 2, 4, 6, and 8 then the 64 modulation constellation arranged across the 81 QAM grid contains rows and columns located at −8, −6, −4, −2, 2, 4, 6, and 8. By moving each quadrant of the 16 QAM constellations towards the centre by one (so that negative coordinates are increased by one and positive coordinates are decreased by one), a 64 QAM constellation can be formed having rows and columns located at −7, −5, −3, −1, 1, 3, 5 and 7. This is known as the "shrunk 81 grid". The same principle may be applied to any suitable grid. Equally, the same principle may be applied to "grow" grids by translating each transformed data set outwards from the centre.

Often the amplitude and phase modulation of a received carrier signal will not map exactly onto one of the modulation points in the constellation due to poor propagation conditions, circuit inaccuracies etc. Therefore, the decoder may determine which of the modulation points a received amplitude and phase modulation is most closely associated. This may be achieved by determining with which modulation point in the constellation the received amplitude and phase modulation is separated by the smallest Euclidean distance (i.e. determining which of the modulation points the combination of the received amplitude and phase modulation would be closest to if it were plotted on the modulation constellation).

Suitably the first and second mapping functions map symbols that are mapped onto the same modulation point for one carrier signal onto different modulation points on the other carrier signal. The first and second mapping functions also suitably map the symbols onto points on the other carrier signal that are relatively distant from each other in the modulation constellation, e.g. as shown in FIG. 7. This enables the different symbols to be distinguished from each other on the other carrier signal even when that carrier signal is subject to poor propagation conditions. This large spacing may therefore help to limit the impact that reducing the redundancy has on error rates because the symbols may be correctly decoded even when one of the signals is subject to poor propagation conditions.

Figure 9:
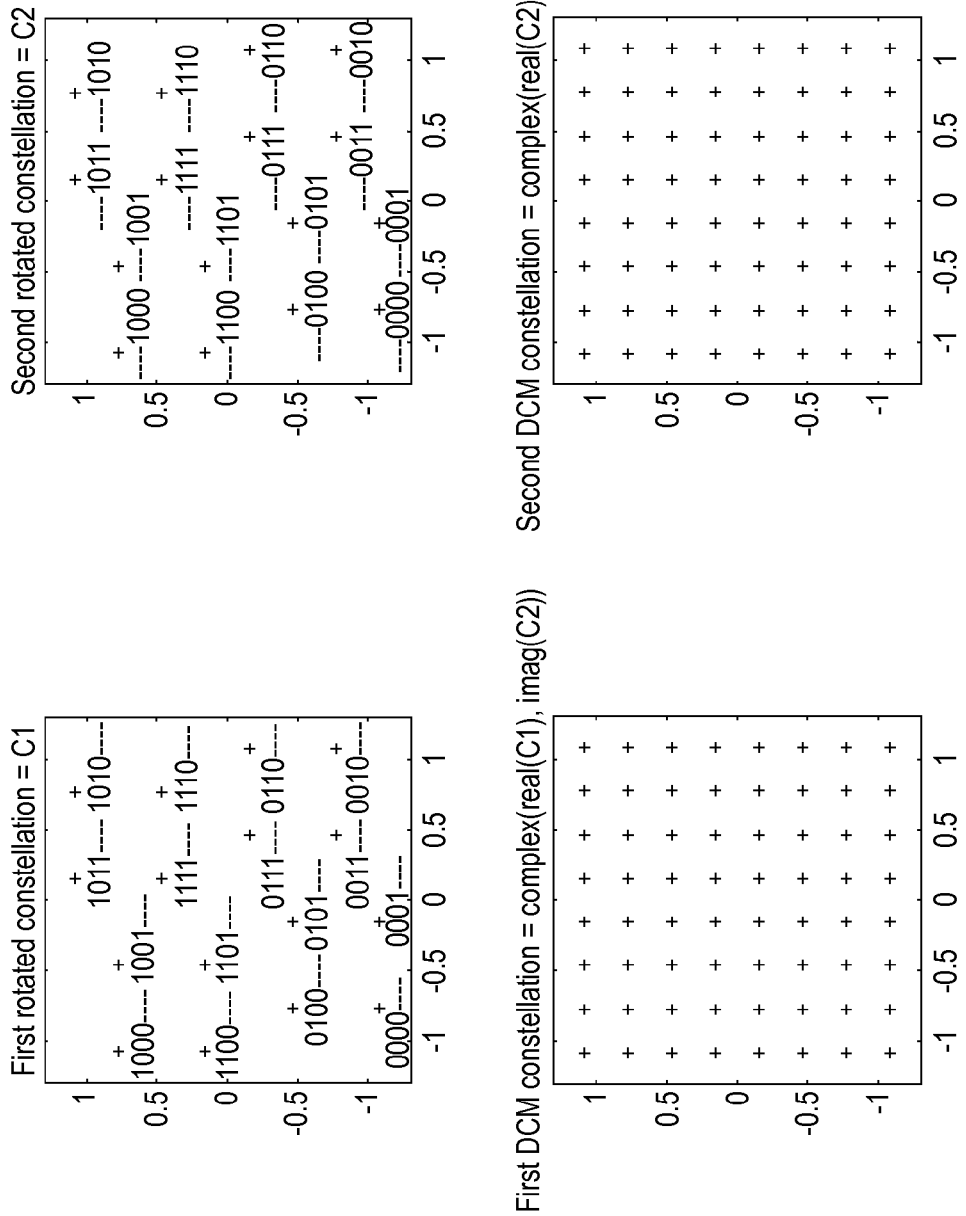
FIG. 9 illustrates a formation of a 64 QAM modulation constellation.
Figure 10:
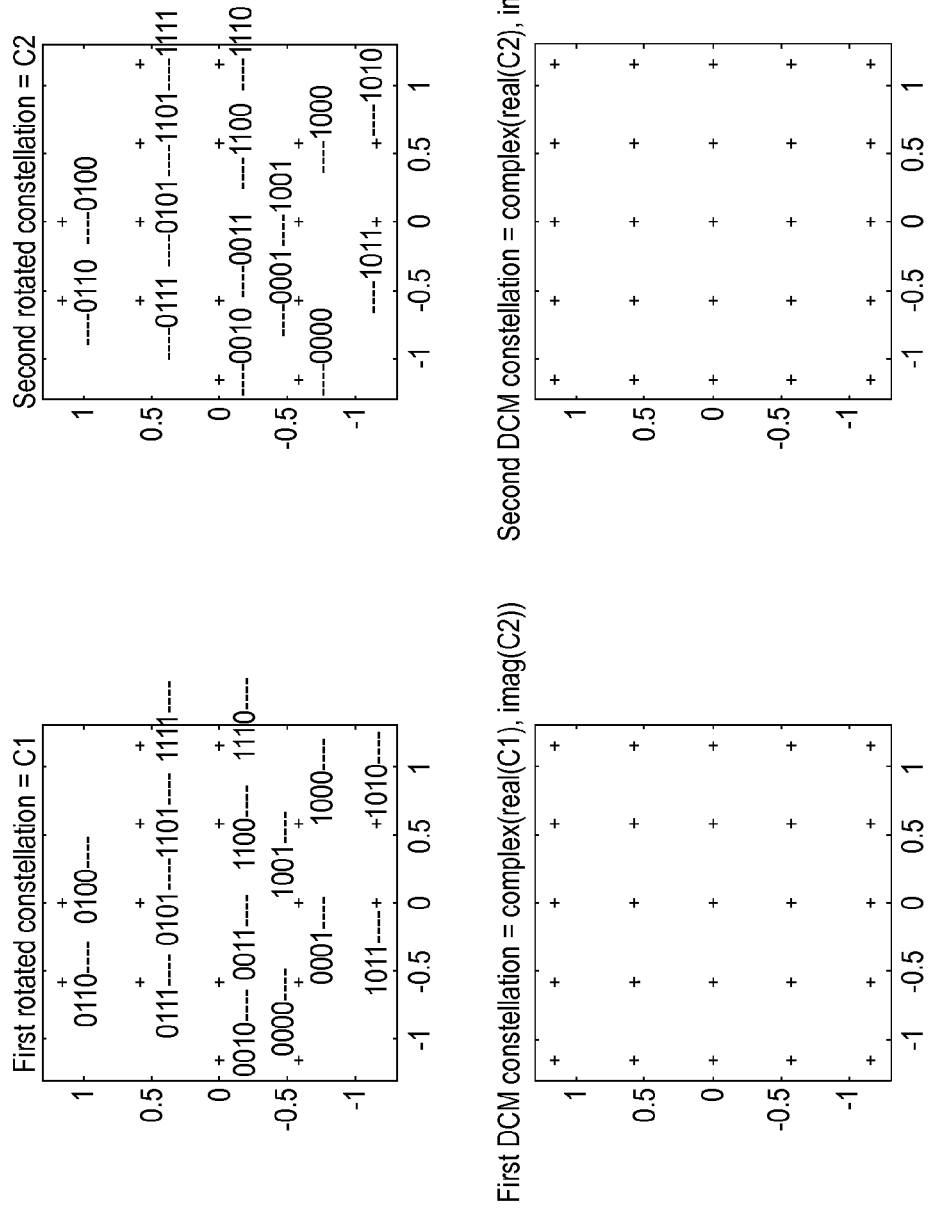
FIG. 10 shows the formation of a 25 QAM modulation constellation.
Figure 11:
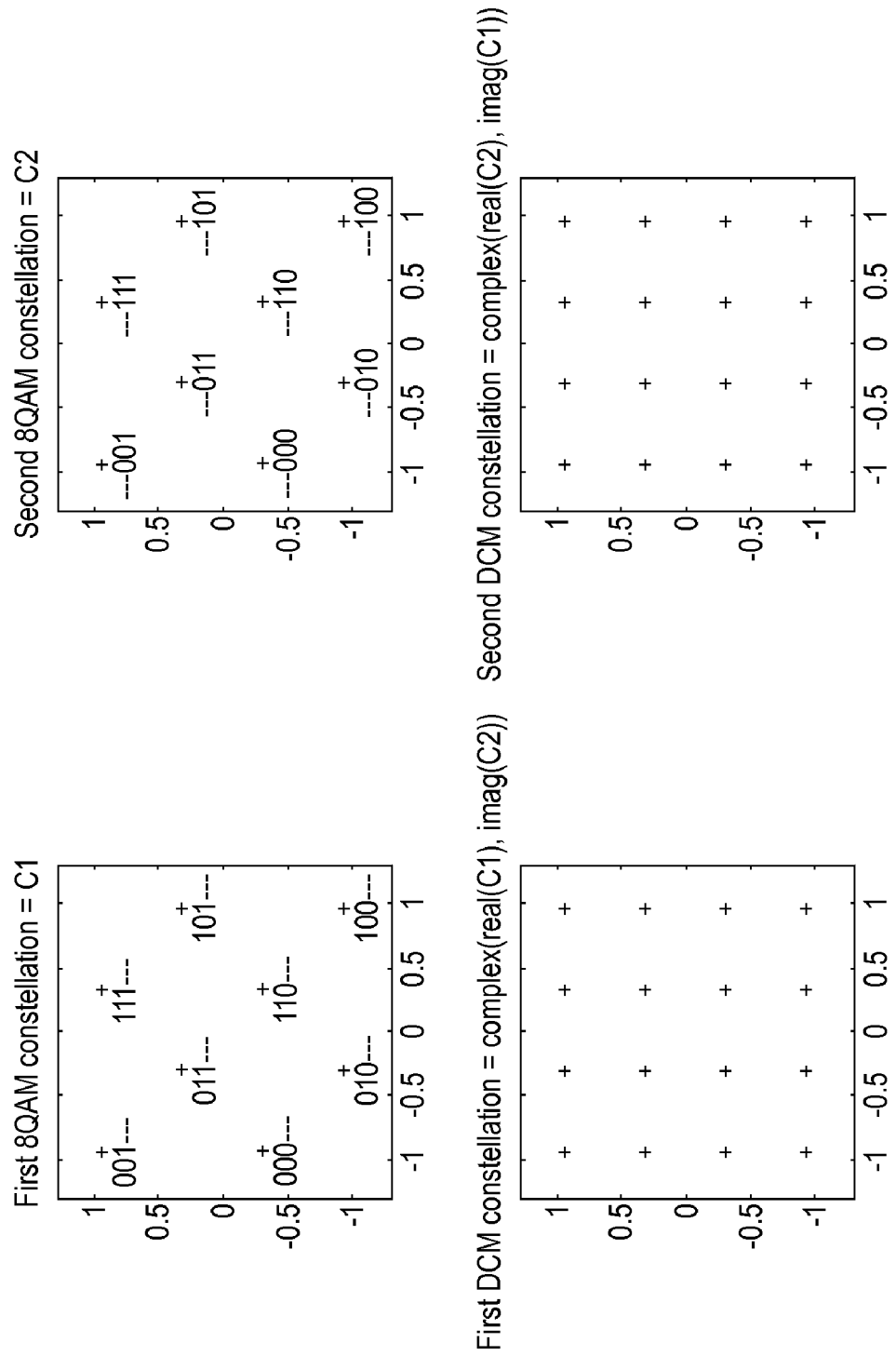
FIG. 11 shows the formation of a 16 QAM modulation constellation.

Further examples of coding schemes in which symbols may be mapped are shown in FIGS. 9 to 11. FIG. 9 shows a scheme which is similar to that shown in FIG. 7 but in which each of the quadrants has been translated rather than rotated. This produces a 64 QAM grid as shown. The modulation constellation is therefore contains the same number of modulation points as the constellation shown in FIG. 7, but these points are on average more evenly spaced. FIG. 10 shows a scheme in which each quadrant of the 16 QAM data sets is translated further than in the scheme of FIG. 9. In this scheme, many of the rows and columns contain four of the possible bit value combinations. This results in a modulation grid having only 25 points. This scheme therefore further reduces the complexity at the receiver but at the expense of a further loss in redundancy (and therefore a likely increase in the error rate). FIG. 11 shows a scheme for producing a 16 QAM grid for coding six-bit symbols.

Each of FIGS. 7 to 11 illustrates an example in which the rows and columns of the modulation constellation are shown directly aligned with the rows and columns of the transformed data sets. However, this exact alignment is not necessary. The same principles of mapping symbols from the data sets onto equivalent rows and columns in the modulation constellation apply irrespective of whether those equivalent rows and columns are exactly aligned with the rows and columns of the transformed arrays.

Figure 12A:
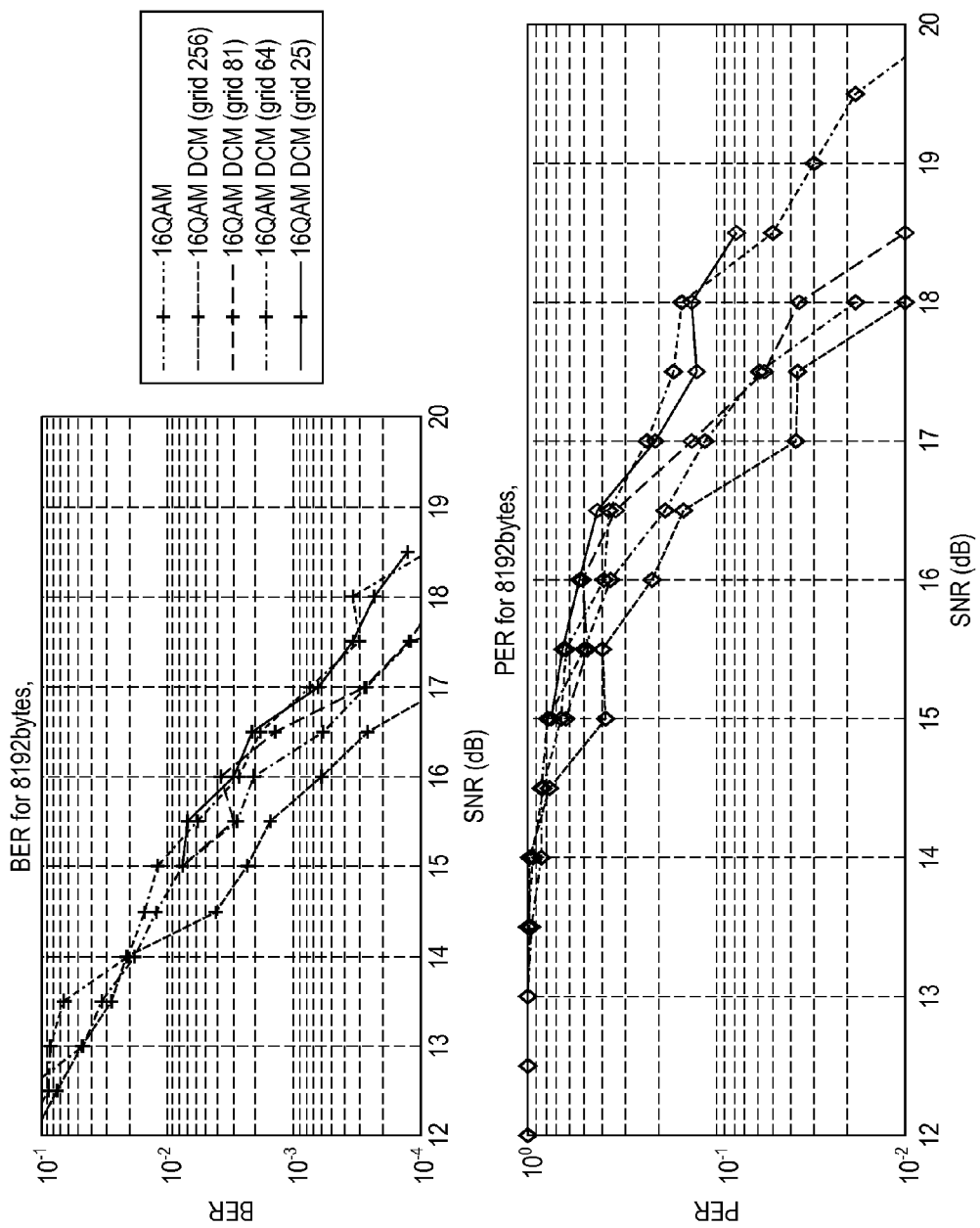
FIGS. 12a and 12b illustrate the performance of different coding schemes.
Figure 12B:
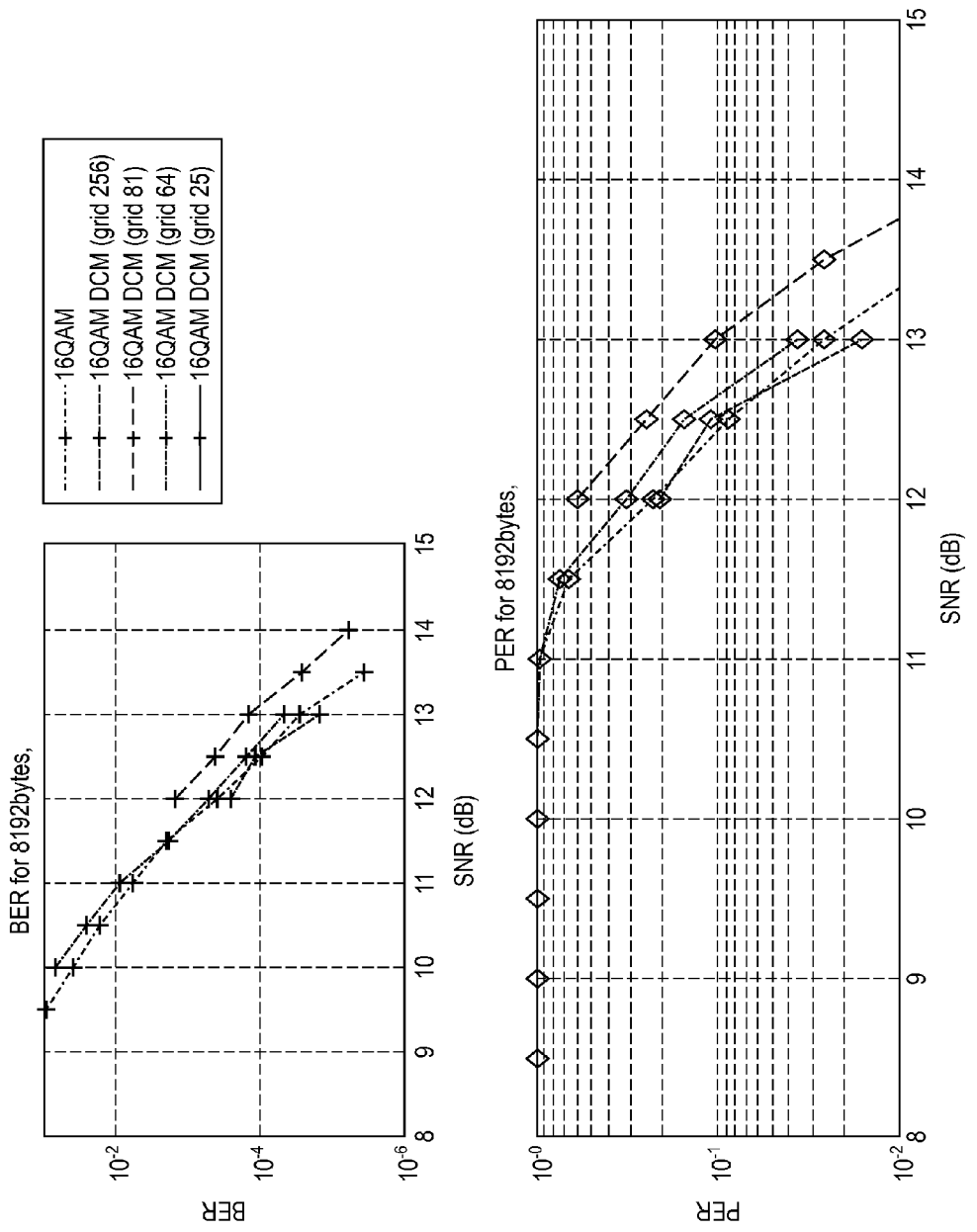

FIGS. 12a and 12b illustrate the performances of some of the coding schemes described above. FIG. 12a illustrates performances in a CM1 environment and FIG. 12b illustrates performances in an AWGN environment. The 64 QAM scheme illustrated in FIG. 9 may provide the best performance for those schemes that encode eight-bit symbols.

The coding schemes described above may provide the following advantages. First, the coding schemes provide good multi-path performance. In particular, almost the same diversity gain is achieved as for existing DCM schemes. Second, a good AWGN performance is achieved. Indeed, AWGN performance sees no significant loss in performance over existing DCM or 16 QAM schemes. Third, because of the reduced constellation order, so fewer bits (typically one fewer) are required for the ADCs and the DACs in the transmitted and receiver. Fourth, there is a reduced signal dynamic so fewer bits are required for the digital processing (again, typically one bit fewer) in the receiver. The processing required at the receiver is also less complex and requires a simpler maximum likelihood decoding as there are fewer points to compare than in existing schemes that use 256 constellation points. In fact, with some loss in accuracy, a standard 16 QAM decoder may be used instead of a maximum likelihood decoder.

The constellations shown in FIGS. 7 to 11 relate to specific examples only of how the mapping between data symbols and modulation points might be achieved. In particular, some unitary transforms of the constellations shown in these figures might achieve substantially the same results as the constellations shown. For example, the constellations might be rotated by 90, 180 or 270 degrees or reflected in the in-phase or quadrature axes. The imaginary components (e.g. quadrature components) of any of the C1 data words might be swapped with the real components (i.e. in-phase components) with a corresponding C2 data word, e.g. a data word that is located in the equivalent row-column position in the C2 constellation, and vice versa. Also, a C1 data word might be exchanged in its entirety with a corresponding C2 data word. Other non-unitary transforms might also be used. For example, any combination of bit swappings between or within the data symbols, so that different data symbols are positioned at different locations within the constellations.

An encoder may be arranged to encode data symbols for transmission in accordance with any of the general encoding principles described above and in particular in accordance with any scheme that utilises the mapping principles defined by the constellations shown in the figures. An encoder need not perform the steps of forming and transforming each constellation itself, but may instead utilise look-up tables or the like that define mappings between data symbols and amplitude and phase modulations for each carrier in accordance with the general encoding principles described above.

Figure 13:
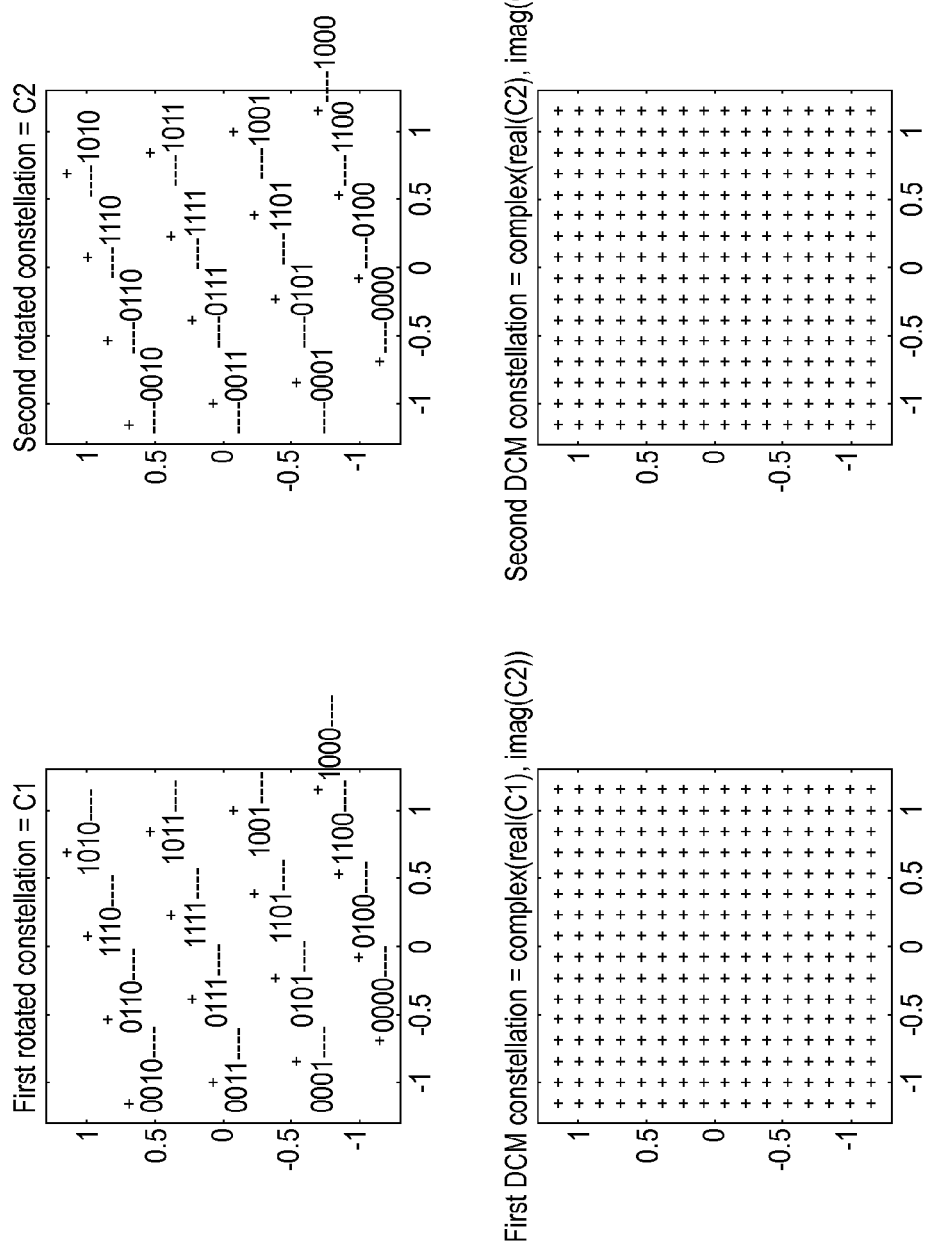
FIG. 13 illustrates a formation of a 256 QAM modulation constellation.
Figure 7:
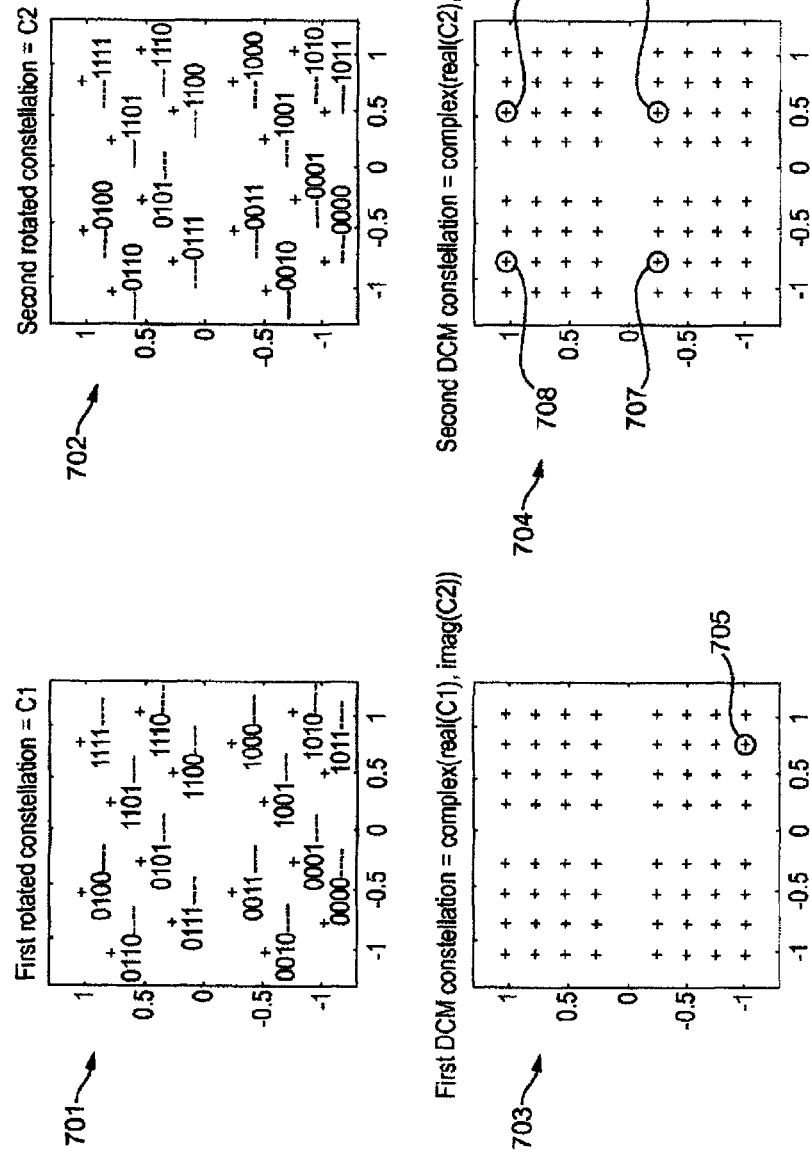

In existing DCM schemes the starting data sets are rotated in their entirety when forming the transformed data sets that are used as the basis for forming the modulation constellations. However, it is also possible to rotate subsets of the data set individually, e.g. by rotating each quadrant individually. This has been described above for the coding schemes that use a reduced modulation constellation; however, the same principle may also be applied to schemes in which the number of modulation points is not reduced. For example, FIG. 13 shows an example in which a 256 QAM modulation constellation is formed from a rotated 16 QAM constellation. The rotation angle applied to each quadrant is lower than that used in existing DCM schemes, atan(¼) (approximately 14 degrees) rather than atan(½) (approximately 27 degrees). The constellation shown in FIG. 13 performs better than existing coding schemes using 256 QAM constellations that are formed by rotating the entirety of the 16 QAM constellations.

Specific examples of a coding scheme are described above and shown in the figures. However, it should be understood that these are for the purposes of example only. The coding and decoding units described herein may be used to implement any specific coding scheme that implements the coding principles described above. In particular, the data symbols may contain different numbers of bits, the constellations may have different arrangement and different mapping functions may be used from those specifically described. Also, the encoding scheme may be applied to different forms of modulation from amplitude and phase modulation. For example, the encoding scheme could be used to determine frequency modulations.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

What is claimed is:

1. A coding unit for determining two different types of modulation to be applied to two carrier signals such that each modulated carrier signal represents a data symbol in accordance with a group of modulation points, each modulation point representing a modulation of the first type and a modulation of the second type that can be applied to one of the carrier signals, the coding unit comprising:

a mapping unit that associates an input data symbol with a first one of the modulation points by applying a first mapping function to the input data symbol and also associates the input data symbol with a second one of the modulation points by applying a second mapping function to the input data symbol, the first and second mapping functions being such that they each map two different data symbols to a respective common modulation point, and such that a first data symbol that is associated with a first modulation point that is the same as a first modulation point of another data symbol is associated with a second modulation point that is different from the second modulation point of said other data symbol; and a modulation determination unit that determines the modulations of the first and second types to be applied to the first carrier signal to be the modulations of the first and second types represented by the first modulation point and the modulations of the first and second types to be applied to the second carrier signal to be the modulations of the first and second types represented by the second modulation point, and outputs control signals to modulator circuitry that modulates said carrier signals in accordance with the determined modulations.

2. The coding unit as claimed in claim 1, wherein each data symbol is capable of representing one of a predetermined number of values, the coding unit being arranged to determine the group of modulation points such that the number of modulation points is less than that number of predetermined values.

3. The coding unit as claimed in claim 1, wherein the coding unit is arranged to form an array of modulation points in which the modulation points are arranged in rows and columns in the in-phase and quadrature space.

4. The coding unit as claimed in claim 3, wherein the coding unit is arranged to associate the first data symbol with a second modulation point that is distant in the array from the second modulation point of the other data symbol.

5. The coding unit as claimed in claim 3, wherein each data symbol comprises a predetermined number of bits that can each take one of a predetermined set of bit values, the coding unit being arranged to form a data set that contains every combination of the bit values that can be represented by half of that predetermined number of bits.

6. The coding unit as claimed in claim 5, wherein the coding unit is arranged to form the data set into an array of bit value combinations in which the bit value combinations are arranged in rows and columns in the in-phase and quadrature space.

7. The coding unit as claimed in claim 6, wherein the coding unit is arranged to form the array of bit value combinations into a 16 QAM constellation.

8. The coding unit as claimed in claim 6, wherein the coding unit is arranged to form the array of bit value combinations into an 8 QAM constellation.

9. The coding unit as claimed in claim 6, wherein the coding unit is arranged to apply a function to the array of bit value combinations to form a transformed array in which the bit value combinations are arranged in more rows and/or columns than in the array of bit value combinations.

10. The coding unit as claimed in claim 9, wherein the coding unit is arranged to form the transformed array such that at least one of the rows and/or columns of the transformed array contains more than one bit value combination.

11. The coding unit as claimed in claim 9, wherein the coding unit is arranged to apply a translation function to the array of bit value combinations to form the transformed array.

12. The coding unit as claimed in claim 9, wherein the coding unit is arranged to apply a rotation function to the array of bit value combinations to form the transformed array.

13. The coding unit as claimed in claim 9, wherein the coding unit is arranged to form the array of bit value combinations to contain a plurality of subsets of bit value combinations, the coding unit being arranged to apply a function to each of those subsets individually to form the transformed array.

14. The coding unit as claimed in claim 13, wherein the coding unit is arranged to form the array of bit value combinations such that the bit value combinations are arranged into four quadrants, the coding unit being arranged to apply a function to each of those quadrants individually.

15. The coding unit as claimed in claim 9, wherein the coding unit is arranged to apply a second function to the transformed array to form a contracted array in which each row and/or column is located closer to its neighbouring row and/or column than in the transformed array.

16. The coding unit as claimed in claim 15, wherein the coding unit is arranged to form the array of modulation points to have the same number of rows and columns as the transformed array such that each row of the transformed array is associated with an equivalent row in the array of modulation points and each column of the transformed array is associated with an equivalent row in the array of modulation points.

17. The coding unit as claimed in claim 16, wherein the coding unit is arranged to form the array of modulation points such that the spacing between neighbouring rows and columns in the array of modulation points is equal to the spacing between neighbouring rows and columns in the contracted array.

18. The coding unit as claimed in claim 16, wherein the coding unit is arranged to form the array of modulation points into a 64 QAM constellation.

19. The coding unit as claimed in claim 16, wherein the coding unit is arranged to form the array of modulation points into a 16 QAM constellation.

20. The coding unit as claimed in claim 5, wherein the coding unit is arranged to form two data sets, each containing every combination of the predetermined set of bit values that can be represented by half of the predetermined number of bits, form each data set into an array containing those bit value combinations arranged in rows and columns in the in-phase and quadrature space, and apply a function to each of those arrays of bit value combinations to form first and second transformed arrays.

21. The coding unit as claimed in claim 20, wherein the coding unit is arranged to associate the data symbol with a first modulation point by:
   determining the bit value combination comprised in the first half of the plurality of bits of the symbol and identifying a column in the first transformed array in which that bit value combination is located;
   determining the bit value combination comprised in the second half of the plurality of bits of the symbol and identifying a row in the second transformed array in which that bit value combination is located; and
   associating the data symbol with the modulation point located in the equivalent row in the array of modulation points to the identified row and the equivalent column in the array of modulation points to the identified column.

22. The coding unit as claimed in claim 20, wherein the coding unit is arranged to associate the data symbol with a second modulation point by:
   determining the bit value combination comprised in the second half of the plurality of bits of the symbol and identifying a column in the second transformed array in which that bit value combination is located;
   determining the bit value combination comprised in the first half of the plurality of bits of the symbol and identifying a row in the first transformed array in which that bit value combination is located; and
   associating the data symbol with the modulation point located in the equivalent row in the array of modulation points to the identified row and the equivalent column in the array of modulation points to the identified column.

23. The coding unit as claimed in claim 1, wherein the coding unit is arranged to associate the data symbol with the first modulation point and the second modulation point such that each of those modulation points represents a different combination of a modulation of the first type and a modulation of the second type.

24. The coding unit as claimed in claim 1, wherein the coding unit is arranged to determine the first type of modulation to be an amplitude modulation.

25. The coding unit as claimed in claim 1, wherein the coding unit is arranged to determine the second type of modulation to be a phase modulation.

26. The coding unit as claimed in claim 1, wherein the coding unit is arranged to directly map the data symbol to the first and second modulation points.

27. The coding unit as claimed in claim 1, wherein the coding unit is arranged to map the data symbol exclusively to a modulation point contained in the group of modulation points.

28. The coding unit as claimed in claim 3, wherein the coding unit is arranged to associate the data symbol with the first modulation point and the second modulation point in accordance with a way of mapping a data symbol onto a modulation point by means of forming a series of arrays.

29. The coding unit as claimed in claim 1, wherein the coding unit is arranged to treat the data symbol as comprising two data words, each data word comprising half of the number of bits comprised in the data symbol.

30. The coding unit as claimed in claim 29, wherein the coding unit is arranged to treat the two data words as if they were each contained in a respective constellation of data words arranged in rows and columns in the in-phase and quadrature space.

31. The coding unit as claimed in claim 30, wherein the coding unit is arranged to treat the group of modulation points as if they were arranged in a constellation of modulation points arranged in rows and columns in the in-phase and quadrature space such that each of said rows corresponds to an equivalent row in each of the constellations of data words and each of said columns corresponds to an equivalent column in each of the constellations of data words.

32. The coding unit as claimed in claim 31, wherein the coding unit is arranged to associate the data symbol with a first modulation point such that the first modulation point would be located in the constellation of modulation points in the equivalent column to the column in which the first one of the data words comprised in that data symbol would be located in its respective constellation of data words and in the equivalent row to the row in which the second one of the data words comprised in that data symbol would be located in its respective constellation of data words.

33. The coding unit as claimed in claim 31, wherein the coding unit is arranged to associate the data symbol with a second modulation point such that the second modulation point would be located in the constellation of modulation points in the equivalent row to the row in which the first one of the data words comprised in that data symbol would be located in its respective constellation of data words and in the equivalent column to the column in which the second one of the data words comprised in that data symbol would be located in its respective constellation of data words.

34. A decoding unit for determining from two modulated carrier signals a transmitted data symbol in dependence on a first type of modulation and a second type of modulation applied to the two carrier signals, the decoding unit comprising:
- a demodulation unit adapted to:
    - determine a modulation of the first type and a modulation of the second type applied to the first carrier signal;
    - determine a modulation of the first type and a modulation of the second type applied to the second carrier signal; and
- a processing unit adapted to:
    - determine a group of modulation points, each modulation point representing a modulation of the first type and a modulation of the second type that can be applied to each of the carrier signals such that a first data symbol that is associated with a first modulation point that is the same as a first modulation point of another data symbol is associated with a second modulation point that is different from the second modulation point of said other data symbol;
    - map a data symbol onto each of the modulation points in accordance with the determinations made by the demodulation unit;
    - map one or more additional data symbols onto at least one of the modulation points in accordance with the determinations made by the demodulation unit;
    - determine a first modulation point with which said modulation of the first type and modulation of the second type applied to the first carrier signal are most closely associated;
    - determine the transmitted data symbol to be the data symbol of the plurality of data symbols mapped to the first modulation point that is most closely associated with the modulations of the first and second type applied to the second carrier signal; and
    - communicate the determined data symbol to an output device.

35. The decoding unit as claimed in claim 34, wherein the decoding unit is arranged to determine that the modulation point with which modulations of the first and second types are most closely associated is the modulation point from which that combination of modulations of the first and second types has the lowest interpoint spacing in the in-phase and quadrature space.

36. The decoding unit as claimed in claim 34, wherein the decoding unit is arranged to map a different one or more data symbols onto each modulation point for the first carrier signal than for the second carrier signal.

37. The decoding unit as claimed in claim 36, wherein the decoding unit is arranged to associate the modulations of the first and second type applied to the first carrier signal with the one or more data symbols mapped for the first carrier signal onto the modulation point from which that combination of modulations of the first and second type has the lowest interpoint spacing in the in-phase and quadrature space.

38. The decoding unit as claimed in claim 36, wherein the decoding unit is arranged to determine that the transmitted data symbol is the data symbol of the more than one data symbols that is mapped for the second carrier signal onto the modulation point from which the combination of the modulations of the first and second type applied to the second carrier signal has the lowest interpoint spacing in the in-phase and quadrature space.

39. The decoding unit as claimed in claim 34, wherein the decoding unit is arranged to determine a transmitted symbol in dependence on a first type of modulation that is an amplitude modulation.

40. The decoding unit as claimed in claim 34, wherein the decoding unit is arranged to determine a transmitted symbol in dependence on a second type of modulation that is a phase modulation.

* * * * *

UNITED STATES PATENT AND TRADEMARK OFFICE
CERTIFICATE OF CORRECTION

| | | |
|---|---|---|
| PATENT NO. | : 8,249,190 B2 | Page 1 of 3 |
| APPLICATION NO. | : 12/397483 | |
| DATED | : August 21, 2012 | |
| INVENTOR(S) | : Olivier Bernard Andre Seller | |

It is certified that error appears in the above-identified patent and that said Letters Patent is hereby corrected as shown below:

Delete sheet 5 of drawings and substitute the attached sheet 5 therefor.

On the column 1, line 57, "part of the second constellation" is corrected to --part of the first constellation--

On the column 3, line 37, "an equivalent row" is corrected to --an equivalent column--

On the column 4, line 19, "is" is corrected to --may be--

On the column 5, line 58, "are" is corrected to --is--

On the column 5, line 61, "are" is corrected to --is--

On the column 6, lines 40-45,
"The encoder may be arranged to encode a signal for transmission in accordance with an encoding scheme in which data symbols are mapped to a modulation point in the constellation of modulation points by means of constellations arranged as shown in FIGS. 7 to 11 but with each C1 data word exchanged with the corresponding C2 data word." is omitted.

On the column 7, lines 46-47, "constellation unit" is corrected to --a constellation unit 502--

On the column 8, line 63, "decoding" is corrected to --demodulation--

On the column 8, line 65, "decoding" is corrected to --demodulation--

On the column 9, line 7, "decoding" is corrected to --demodulation--

On the column 9, line 22, "able determine" is corrected to --able to determine--

<div style="text-align:center">

Signed and Sealed this
Twenty-sixth Day of March, 2013

Teresa Stanek Rea
*Acting Director of the United States Patent and Trademark Office*

</div>

CERTIFICATE OF CORRECTION (continued)
U.S. Pat. No. 8,249,190 B2

On the column 10, line 51, "703" is corrected to --704--

On the column 10, line 53, "703" is corrected to --704--

On the column 11, line 8, "707" is corrected to --709--
To comply this correction, the Fig. 7 is also corrected. The replacement sheet is attached.

On the column 12, line 7, "is" is omitted.

On the column 12, line 38, "so" is omitted.

On the column 12, lines 57-58, "with a corresponding" is corrected to --of a corresponding--

On the column 14, lines 1-5,
"such that a first data symbol that is associated with a first modulation point that is the same as a first modulation point of another data symbol is associated with a second modulation point that is different from the second modulation point of said other data symbol; and" is omitted.

On the column 15, line 18, "row" is corrected to --column--

On the column 17, lines 17-22,
"such that a first data symbol that is associated with a first modulation point that is the same as a first modulation point of another data symbol is associated with a second modulation point that is different from the second modulation point of said other data symbol;" is omitted.